Figure 1:
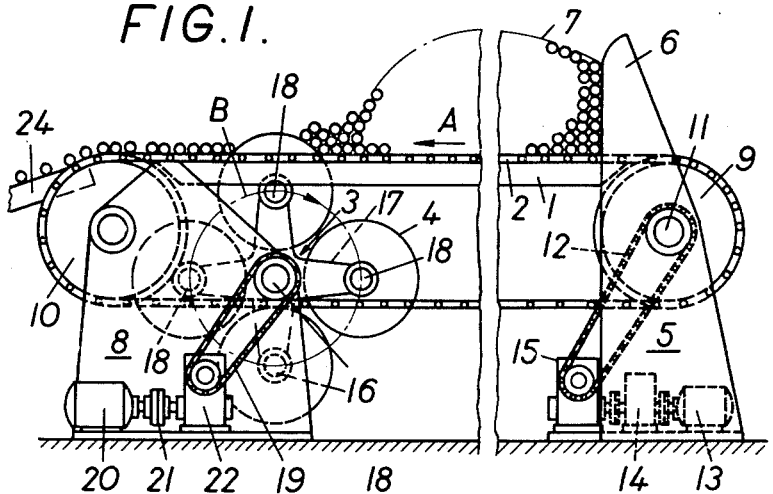

Sept. 12, 1961     O. J. SMEJDA     2,999,603
APPARATUS FOR ARRANGEMENT OF RODS

Filed May 13, 1960     3 Sheets—Sheet 1

OSCAR JOSEPH SMEJDA
Inventor

By Wenderoth, Lind & Ponack
Attorneys

Sept. 12, 1961   O. J. SMEJDA   2,999,603
APPARATUS FOR ARRANGEMENT OF RODS
Filed May 13, 1960   3 Sheets-Sheet 2

Oscar Joseph Smejda
Inventor

By Wenderoth, Lind & Ponack
Attorneys

Sept. 12, 1961 O. J. SMEJDA 2,999,603
APPARATUS FOR ARRANGEMENT OF RODS
Filed May 13, 1960 3 Sheets-Sheet 3

OSCAR JOSEPH SMEJDA
INVENTOR

BY Wenderoth, Lind & Ponack
ATTORNEYS

United States Patent Office 2,999,603
Patented Sept. 12, 1961

2,999,603
APPARATUS FOR ARRANGEMENT OF RODS
Oscar Josef Smejda, Nydalen, Oslo, Norway, assignor to Christiania Spigerverk, Nydalen, Oslo, Norway
Filed May 13, 1960, Ser. No. 29,081
Claims priority, application Norway May 15, 1959
8 Claims. (Cl. 214—1)

The present invention relates to handling of rods and rodshaped bodies. In the following description and in the claims the term "rod" is used in a wide sense, comprising any elongated, substantially straight article having circular, oval, polygonal or other cross section, and being compact or hollow, as for instance a tube.

The invention relates more specifically to an apparatus for orderly feeding of rods from a bundle. The term "orderly feeding" is used in this specification to designate arranging a bundle of rods into a layer of parallel rods which is one rod thick. The apparatus according to the invention is primarily designed for use in roller mills, woodprocessing factories and similar works, but the invention is not limited to such use.

Several apparatuses are already known for the orderly feeding of rods from a heap or bundle. The present invention relates to an apparatus of the kind comprising a plurality of longitudinally extending, substantially horizontal support means upon which the bundle of rods to be orderly fed is supported with the rods extending in a main direction which is substantially transverse to the direction of the support means, and comprising further a plurality of cylindrical bodies and a driving mechanism by means of which the bundle of rods and the said cylindrical bodies can be moved relatively to each other and in contact with each other in such a manner that the rods are being lifted upwardly and spread into a layer. An apparatus of this general type is shown and described in U.S. patent application Serial No. 807,877, now Patent No. 2,946,463.

It is an object of the invention to provide an apparatus of the kind described having a relatively short length and a large capacity.

The apparatus according to the present invention has the feature common with the apparatus according to the said U.S. patent application that the relative movement of the cylidrical bodies and the bundle of rods is used to lift and spread the rods. The main difference between the apparatus according to the invention and the apparatus according to the said U.S. patent application consists therein that the cylindrical bodies according to the present invention are moved in such a manner that the axis of each cylindrical body describes an arc shaped path, whereas the movement of the cylindrical bodies according to the said application is rectilinear.

According to the invention the apparatus comprises one or more carriers, each carrier carrying one or more cylindrical bodies and being adapted to rotate continuously or oscillatorily. The carrier or carriers can simultaneously be adapted to be moved to and fro in horizontal direction in parallel with the supports for the bundle.

When the carrier, or each carrier is adapted to rotate or oscillate about a fixed axis, the apparatus according to the invention is preferably provided with endless chains the upper course of each chain being movably supported on one of said supports and being driven either continuously in one direction or alternatingly in opposite directions.

When the carrier is adapted to be moved to and fro in addition to the oscillating or rotating movement, such chains are not required.

Figure 2:
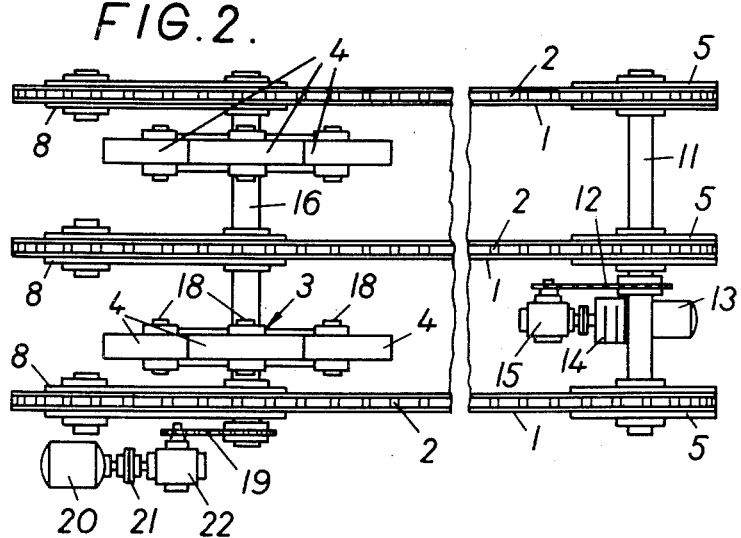
Figure 3:
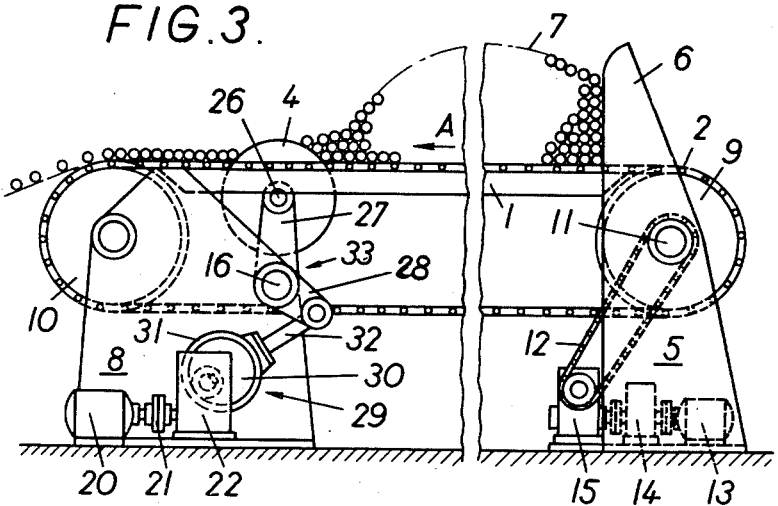
Figure 4:
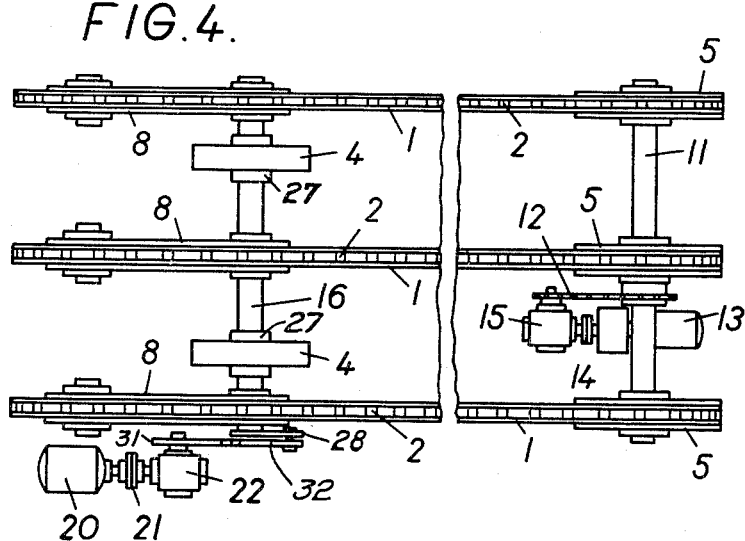

In order that the invention should be more easily understood it will in the following be described more in detail in connection with three embodiments being diagrammatically shown in the accompanying drawings, in which:

FIGURE 1 shows a side view of an apparatus according to a first embodiment of the present invention, and
FIGURE 2 is a corresponding plan view.
FIGURES 3 and 4 show in a corresponding manner a second embodiment and
FIGURES 5 and 6 a third embodiment.

Identical elements in the different figures are designated with the same reference numerals.

Referring now to FIGURES 1 and 2, 1 denotes three parallel, horizontally supported rails, whilst 2 denotes endless chains the upper course of which is movably supported on the rails. 3 denotes in general a carrier carrying four right circular cylindrical bodies 4.

The rails 1 are at their upper end supported on end supports 5 which extend some distance upwards above the rails, so that they form stops 6 for a bundle of rods 7, such stops, however, not being always necessary for the function of the apparatus.

At their left end the rails are supported on end supports 8.

The chains 2 are carried over chain wheels 9 and 10. The chain wheels 9 are firmly fitted to a common shaft 11, which is journalled in the supports 5. The shaft 11 is driven by means of belt or chain transmission 12 from a motor 13 with an appurtenant variator 14 for regulation of speed which is most favourable for the rods concerned, and a gear 15. Several carriers 3 can also be fitted with intervals in the longitudinal direction of the rails.

The chain wheels 10 are individually journalled in the supports 8. The chains are driven by means of the driving mechanism 12 to 15, in the direction indicated by the arrow A.

The carrier 3 comprises a shaft 16, to which there is firmly fitted two or more spiders 17, each provided with four arms, at the outer ends of which there are fitted bearing pivots 18 for the freely rotatory journalled cylindrical bodies 4. The carrier 3 is driven by means of belt or chain transmission 19 from a motor 20 with appurtenant coupling 21 and gear 22. The direction of rotation for the carrier is shown by the arrow B. The shaft 16 can also, if desired, be combined with the shaft pivots for the chain wheels 10, i.e. utilized for journalling of the said chain wheels.

The mode of operation of the apparatus is as follows:

A bundle of rods 7 is placed on the rails or on the chains 2 resting on the beams 1, between the carrier 3 and the stops 6. When the chains 2 and the carrier 3 are started, the bundle will be carried in direction to the left, toward that row of the bodies 4 which is positioned in its uppermost position. The bodies have the effect that the foremost rods are lifted up, as indicated in FIG. 1. By the further rotation of the carrier the uppermost cylinders will be moved to the right and at the same time downwards, whereas the rods will glide down on the chains at the rear of the chains further to the left. Other rods from the bundle follow continuously, are arranged by following rows of cylindrical bodies, which are moved up from below into the spaces between the rails, and carried further to the left in orderly layer to join the foregoing rods.

From the left end of the apparatus the rods 23 can, for example, glide down on to a chute conveyor 24.

The apparatus according to the invention is advantageous where rapid and continuous driving of the rods is demanded, and a short length of construction of the apparatus. If several rows of cylindrical bodies are used and the carrier is given a suitable rotational speed, the number of "underdrives" per time-unit, i.e. the capacity of the apparatus, can be considerably greater than with known apparatuses.

If the apparatus comprises three or more rails, the carrier can conveniently be so constructed that the cylindrical bodies project upwards in two or more spaces between the rails. The apparatus can, however, also be provided with only two rails, in which case the carrier can, if necessary, be so devised that one cylindrical body is fitted on each side of the rails or that only one longer cylindrical body is fitted between the rails. The apparatus according to the invention is preferably provided with three or four symmetrically arranged rows of cylindrical bodies, all bodies being of equal size. This is, however, not necessary. It may be sufficient to use one row of cylindrical bodies which in the simplest case can be reduced to a single cylindrical body.

It is, moreover, not necessary for the cylindrical bodies in all the rows to be equally dimensioned, nor is it necessary for the bodies to be symmetrically arranged round the rotatory axis of the carrier. I have found that equally good, and under certain conditions even better, results can be obtained when the carrier or carriers is or are given an oscillatory rotating movement. Hereby the advantage is obtained that the height of construction is reduced too. Such an embodiment shall now be described referring to FIGURES 3 and 4.

In these figures 1 denotes three parallel, horizontally supported rails and 2 endless chains slidably supported on the rails. 4 are right circular cylindrical bodies mounted in a row on a carrier 33.

The rails are at their right ends supported on end supports 5 extending upwards above the rails so that they form stops 6 for a bundle of rods 7, such stops however not being necessary for a correct operation of the apparatus.

At their left ends the rails are supported on end supports 8.

The chains 2 are passed about chain wheels 9 and 10. The chain wheels are fixedly mounted on a common shaft 11 which is rotatably mounted in the supports 5. The shaft is driven by means of a belt or chain transmission 12 from a motor 13 provided with a variator 14 for adjusting of the chain speed, and a gear 15.

The chain wheels are individually mounted in the supports 8. The chains are driven by means of the drive mechanism 12—15 in the direction indicated with the arrow A.

As far as the above mentioned parts are concerned the embodiment according to FIGURES 3 and 4 corresponds exactly with the embodiment according to FIGURES 1 and 2, with the only exception that the carrier 3 according to FIGURES 1 and 2 carries four rows of cylindrical bodies whereas the carrier 33 according to FIGURES 3 and 4 carries only one row of cylindrical bodies.

The carrier 33 comprises a shaft 16 and a plurality of levers 27 rigidly secured to the shaft and extending in a common plane. Each lever is at its outer end provided with a pivot 26 on which is freely rotatably journalled a cylindrical body 4. In the embodiment shown the bodies are made as right circular cylindrical bodies having equal dimensions. The carrier 33 is operatively connected with a motor 20 by means of a clutch 21, a reduction gear 22 and an excenter mechanism generally denoted by 29. This mechanism comprises an excenter disc 31 and an excenter rod 32 the free end of which is pivotally connected with the free end of a lever 28 being rigidly mounted on the shaft 16.

The operation of the apparatus now described is as follows:

In the position shown in the drawing the bodies 4 are in their uppermost position. The bodies project in this position above the upper edges of the chains 2. By further rotation of the carriers 33 the bodies will be moved to the right and downwards, the axis of each body describing an arc shaped path. During the said movement the bodies bear against the undermost rods in the bundle 7 and lift the rods in a similar manner as described in connection with FIGURES 1 and 2. Some of the lifted rods will glide down to the left of the bodies and hereunder be arranged in a single layer consisting of rods extending parallel and side by side. When the peaks of the bodies have been lowered to a level just below the undermost layer of rods in the bundle 7 the movement of the shaft 16, the carriers and the cylindrical bodies is reversed and the bodies are moved to the left, the axis of each body describing an arc shaped path. During this movement the rods, being already arranged in a single layer, are pushed to the left, and are ready for further transport or other handling. The circular bodies are preferably moved with a greater linear velocity than the chains 2.

It will be obvious for a person skilled in the art that the invention is not limited to the embodiment shown in the drawing. For instance the carrier 33 might be provided with two rows of cylindrical bodies. Further the angular movement of the carrier can be greater than that described in the foregoing description. When the carrier is provided with one row of cylindrical bodies, as shown in the drawing, the movement can be such that the bodies are moved alternatively to each sides of their highest position. The oscillation in opposite directions can be the same or different.

Figure 5:
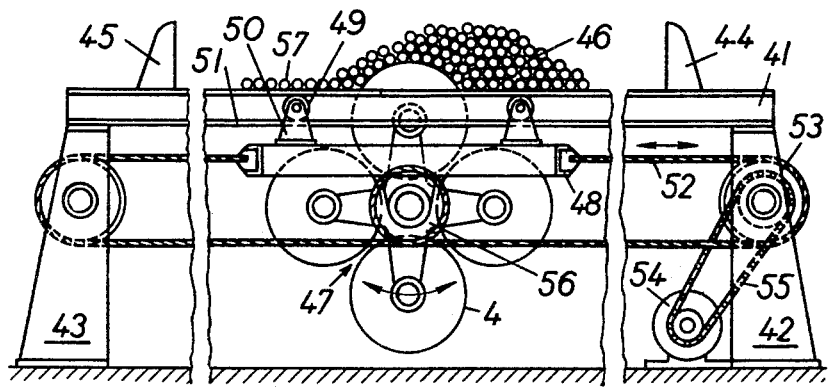
Figure 6:
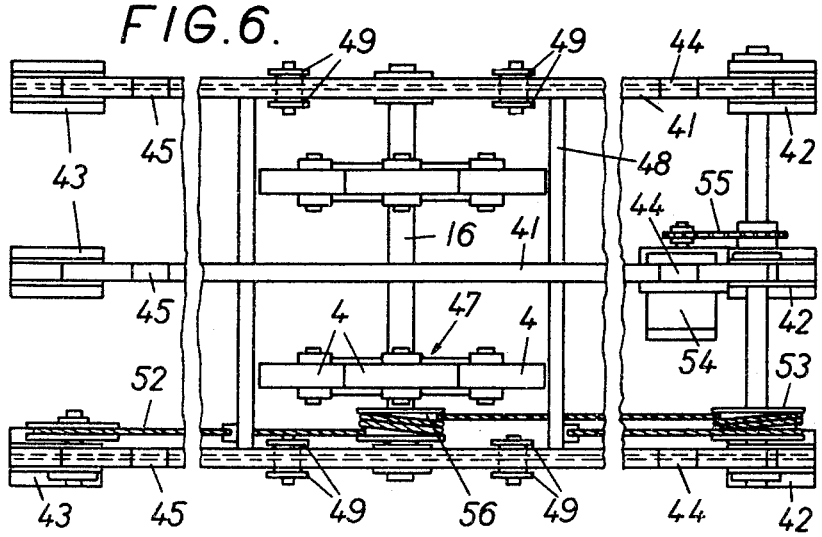

Referring now to the embodiment shown in FIGURES 5 and 6 this embodiment differs from the embodiment according to FIGURES 1 and 2 therein that the carrier is adapted to be moved to and fro in the longitudinal direction of the rails. Further no chains are used on the rails.

41 denotes three parallel, horizontal rails supported at their ends on supports 42 and 43. The rails are provided with stops 44, 45 for limitation of the movement of the rods, but such stops are not always necessary. 46 is a bundle of rods. 47 is a carrier being of exactly the same construction as the carrier 3 in FIGURES 1 and 2, so that a detailed description of the carrier 47 will not be required. The carrier 47 is adapted to be moved to and fro under the bundle of rods. To this end the carrier is supported in a frame 48 being movably suspended in the rails. 49 denotes rollers rotatably mounted near the upper ends of vertical plates 50 secured in pairs on the upper side of the frame 48. The rollers are supported on and adapted to roll along horizontal flanges 51 provided at the bottom part of rails 41, which preferably can have I-profile. 52 is a wire the ends of which are attached to the frame 48, and is passed around a driving drum 53, which is driven from a motor 54 by means of a chain 55 or the like. The wire is also passed around a drum 56 rigidly mounted on the shaft 16, so that the shaft 16 and the carrier 47 will rotate when the frame is moved to and fro by means of the wire 52.

The operation of the apparatus is the following: A bundle of rods 46 is placed on the rails 41. The frame is preferably in its left or right end position. The motor 54 is started and the frame is pulled to its other end position, passing under the bundle of rods. Simultaneously the carrier 47 is rotated, because the wire 52 is passed around the drum 46, and the cylindrical bodies 4 are moved upwards against the rods. The relative movement of the rods and the cylindrical bodies will, as easily will be understood, be substantially the same as according to the embodiment shown in FIGURES 1 and 2, the only difference between the two embodiments being that in the first embodiment the bundle is moved against the carrier, rotating about a fixed axis, whereas in the last embodiment the carrier is moved against the unmoved bundle. The effect of the relative movement of the carrier and the bundle will also be substantially the same according to FIGURES 5 and 6 as according to FIGURES 1 and 2.

In some cases a satisfactory arrangement of the rods can be obtained by passing the carrier once under the bundle of rods. Usually, however, the frame 48 is pulled to and fro repeatedly, the rotation direction of the drum 53 being automatically reversed by means of suitable automatically operated mechanisms not shown in the drawing.

The apparatus can also be driven in such a manner that the carrier is only pulled partly under the bundle of rods and then returned, pushing a number of rods arranged in a single layer away from the bundle. For instance the carrier shown in FIGURE 5 can be returned to the left from the position shown. The stops 45 should in this case be removed. The arranged rods will then be pushed out from the apparatus at its left end, where a chute conveyor as the conveyor 24 shown in FIGURE 1 could be provided. The operation then could be repeated until the whole bundle is arranged and the rods moved away in a single layer.

I claim:

1. An apparatus for arranging a bundle of rods into a layer of parallel rods, comprising a substantially horizontal supporting means for supporting a bundle of rods, support members supporting opposite ends of said supporting means, a carrier rotatably mounted below said supporting means, a cylindrical body freely rotatably mounted on said carrier in such a distance from the axis of the carrier that when the axis of the cylindrical body during rotation of the carrier is in a position vertically above the axis of the carrier, the uppermost part of the said cylindrical body will project above the level of the undermost rods in a bundle of rods resting on said supporting means, means connected to said carrier for rotating the carrier and means for moving a bundle of rods placed on said supporting means in parallel with the axis of the carrier and said carrier in parallel horizontal directions relatively to each other.

2. An apparatus for arranging a bundle of rods into a layer of parallel rods, comprising a substantially horizontal supporting means for supporting a bundle of rods, support members supporting opposite ends of said supporting means, a carrier rotatably mounted below said supporting means, a plurality of right circular cylindrical bodies of equal diameters mounted on said carrier freely rotatably about a common axis, said axis being parallel with the rotation axis of the said carrier, the distance between said two axes being such that when the common axis of the said bodies during rotation of said carrier is in a position vertically above the axis of the carrier, the uppermost parts of said cylindrical bodies will project above the level of the undermost rods in a bundle of rods placed on said supporting means, means connected to said carrier for rotating the carrier and means for moving a bundle of rods placed on said supporting means in parallel with the axis of the carrier and said carrier in parallel horizontal directions relatively to each other.

3. Apparatus as claimed in claim 1 in which said supporting means comprises a plurality of parallel rails and a plurality of parallel, endless chains, each rail supporting movably an upper part of one of said chains, the means for moving a bundle of rods placed on the upper parts of said chains in a direction transverse to the same and said carrier in parallel horizontal directions relatively to each other consists of means connected to said chains for driving the same in longitudinal direction.

4. Apparatus for arranging a bundle of rods into a layer of parallel rods comprising a plurality of spaced, parallel, horizontal rails, support members supporting the ends of the rails, a plurality of chain wheels, one chain wheel near each end of each rail, means for rotatably mounting of said chain wheels, a plurality of chains, each chain being passed around two of said chain wheels being positioned at opposite ends of one of said rails, the upper run of each chain between said chain wheels being movably supported on the rail positioned between said two chain wheels, means connected to said chains for driving the chains with equal speed in longitudinal direction, a carrier rotatably mounted below said rails so that it can rotate about a fixed axis transverse to the longitudinal direction of the rails, a plurality of right circular cylindrical bodies of equal diameters mounted on said carrier freely rotatably about a common axis, said axis being parallel with the rotation axis of the carrier, the distance between said two axes being such that when the common axis of said cylindrical bodies during the rotation of said carrier is in a position vertically above the axis of the carrier, the uppermost parts of said cylindrical bodies will project above the level of the undermost layer of rods in a bundle of rods placed on the upper part at said chains, and means for rotating said carrier.

5. Apparatus as claimed in claim 4 in which the means for rotating the carrier is adapted to impart an oscillating rotational movement to the carrier.

6. Apparatus as claimed in claim 4 comprising a plurality of rows of cylindrical bodies mounted on said carrier, each row comprising a plurality of right circular cylindrical bodies of equal diameters, freely rotatably about a common axis extending in parallel with the axis of the carrier.

7. Apparatus for arranging a bundle of rods into a layer of parallel rods, comprising a plurality of spaced, parallel, horizontal rails, support members supporting the ends of the rails, a frame below the rails moveably mounted in the longitudinal direction of the rails, means connected to said frame for moving said frame to and fro in the longitudinal direction of the rails, a carrier mounted rotatably on said frame about a horizontal axis transverse to the longitudinal direction of the rails, a plurality of right circular cylindrical bodies of equal diameters mounted on said carrier freely rotatably about a common axis, said axis being parallel with the rotation axis of the carrier, the distance between said two axes being such that when the common axis of said cylindrical bodies during the rotation of said carrier is in a position vertically above the axis of the carrier, the uppermost parts of said cylindrical bodies will project above the level of the undermost layer of rods in a bundle of rods placed on the upper parts at said chains, and means for rotating said carrier.

8. Apparatus as claimed in claim 7 in which the means for moving the frame comprises a wire the ends of which are attached to the frame, a drum rotatably mounted near one end of the apparatus, a drum fixedly mounted on the said carrier, a motor operatively connected to the first mentioned drum for rotating the same, a wheel rotatably mounted at the end of the apparatus remote from the first mentioned drum, said wire being passed around said first mentioned drum, said last mentioned drum and said wheel in such a manner that when the frame is moved by means of said wire the carrier will be rotated.

No references cited.